United States Patent Office 3,615,012
Patented Oct. 26, 1971

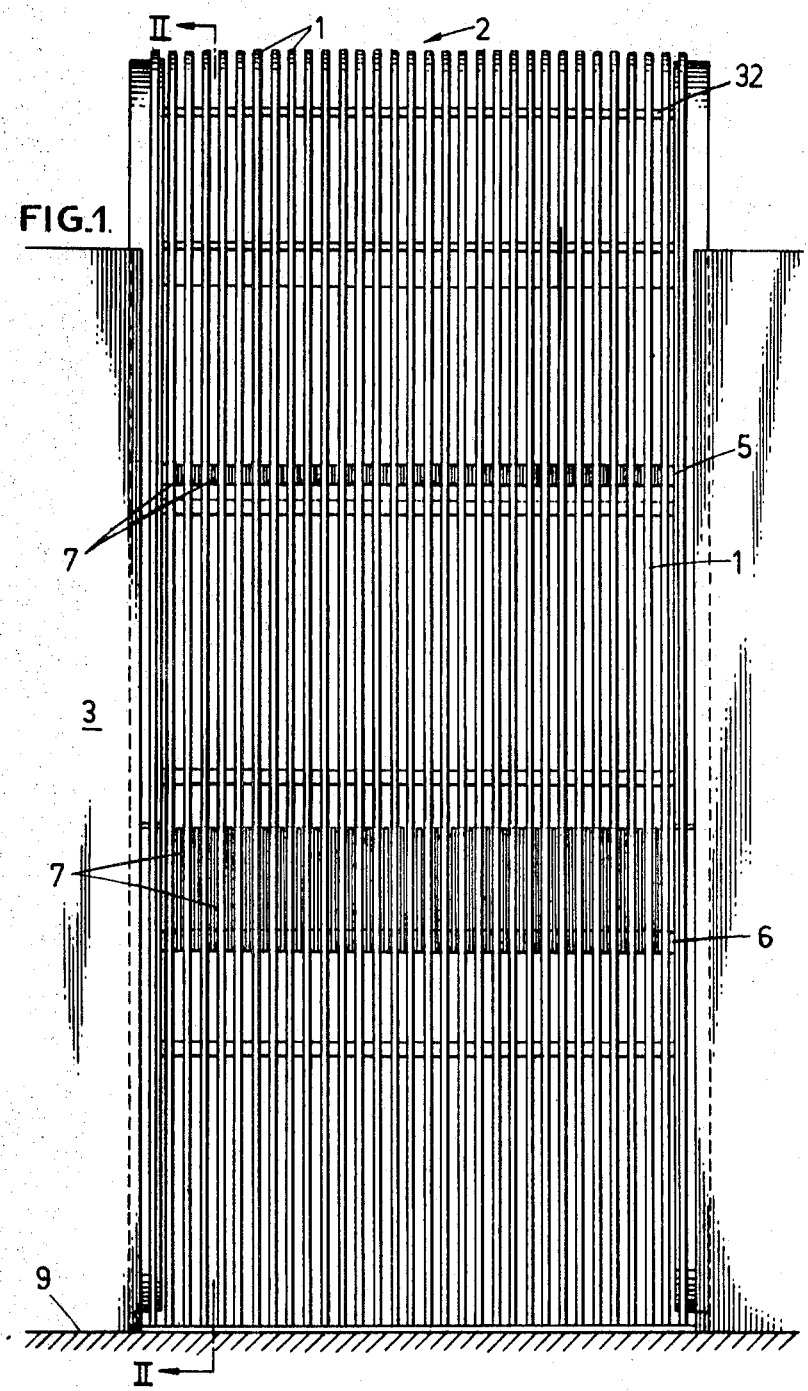

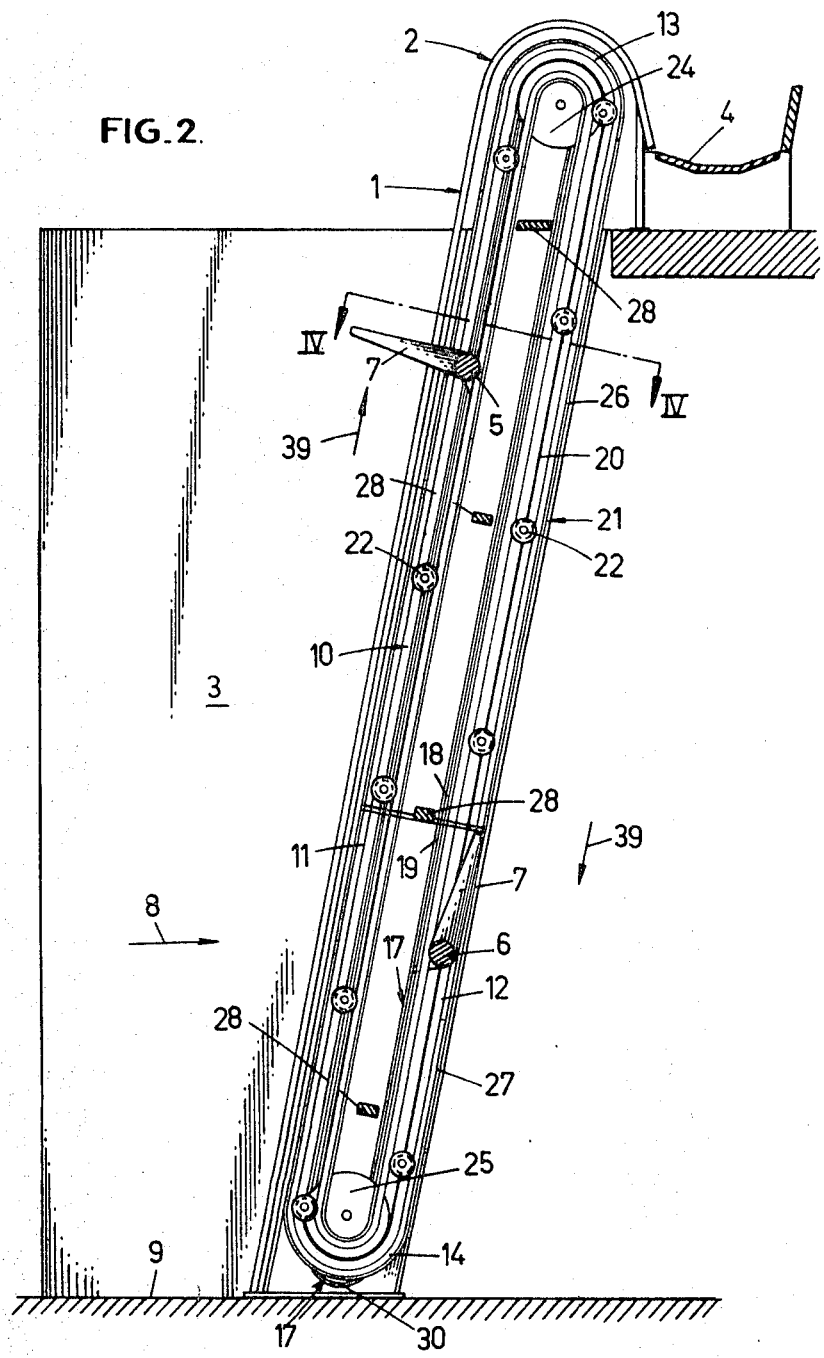

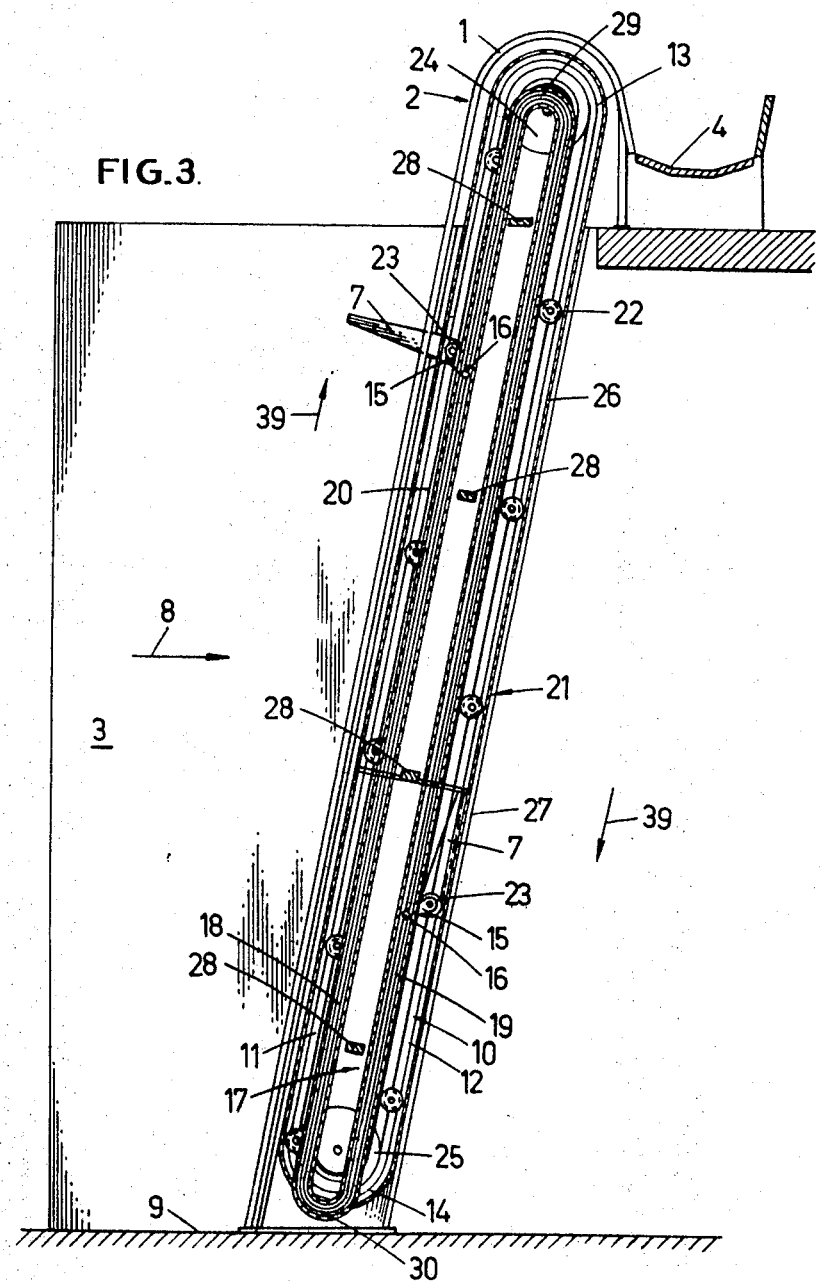

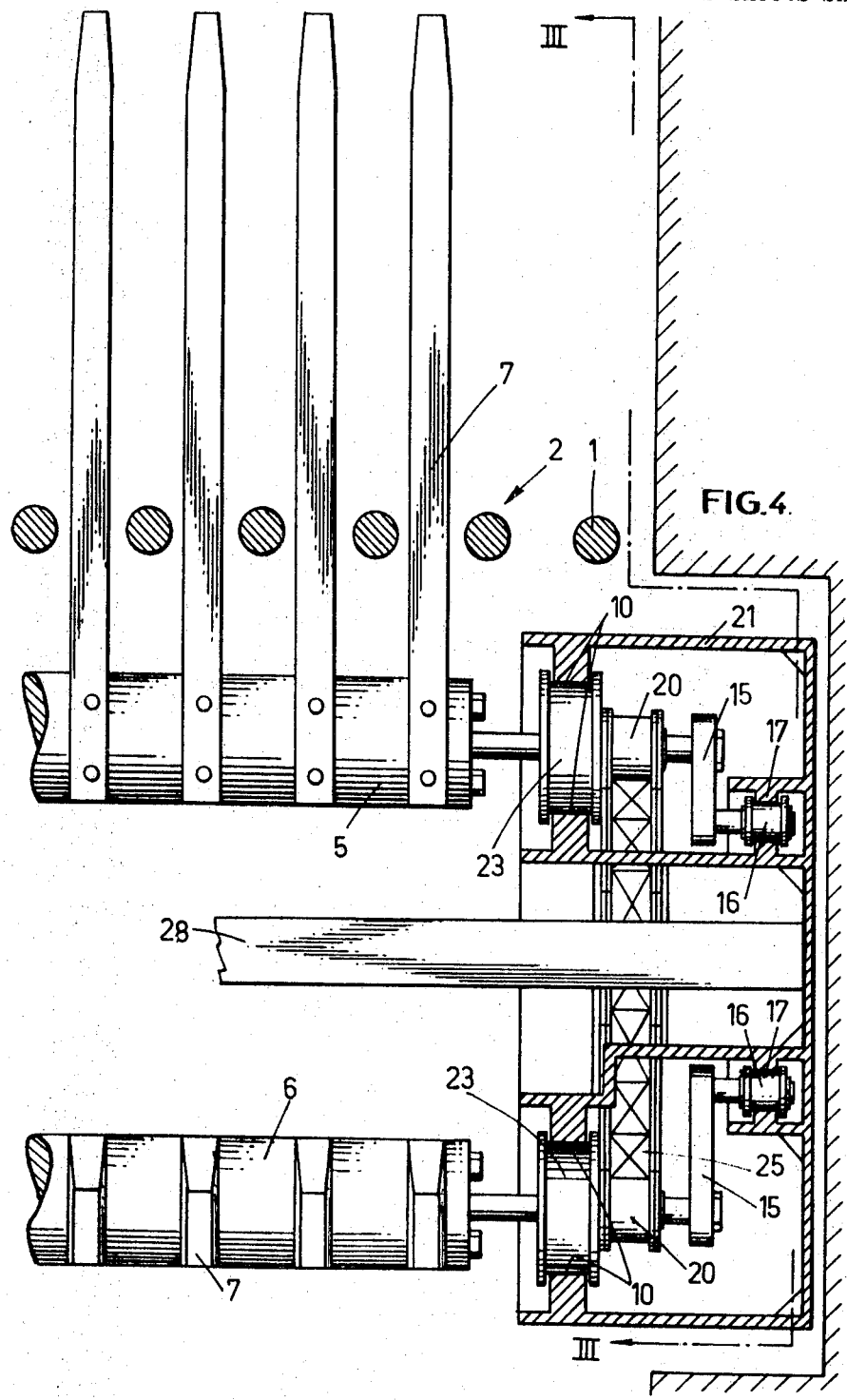

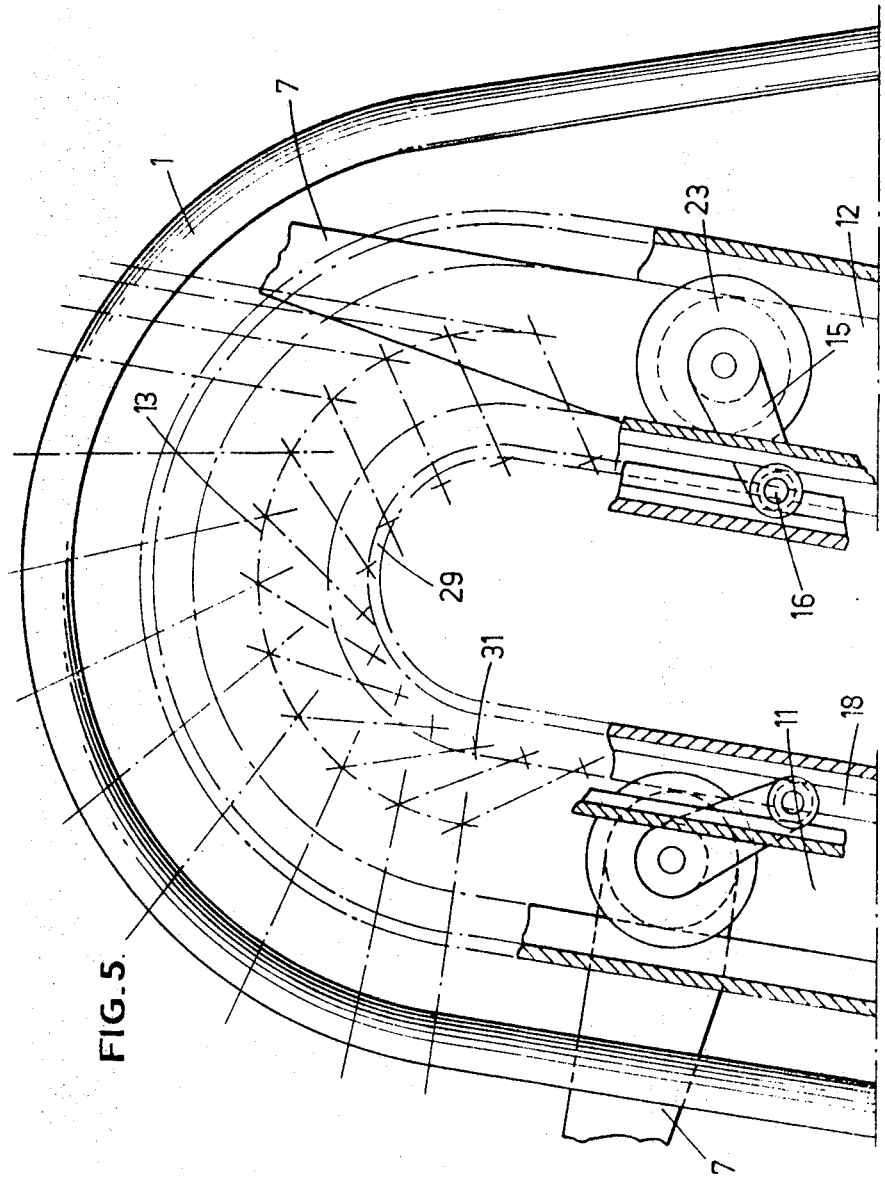

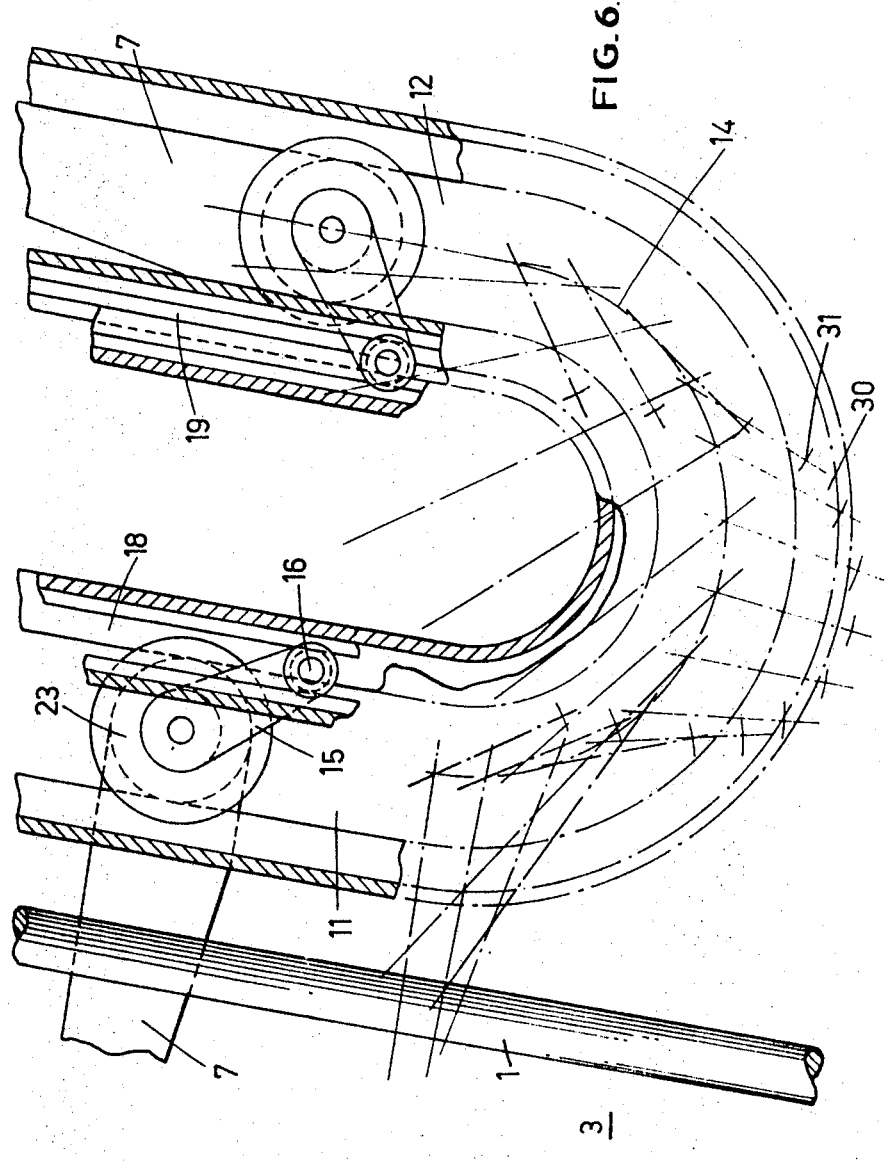

3,615,012
DEVICE FOR PURIFYING LIQUIDS,
PARTICULARLY WATER
Andre Verbandt, 130 Parmentierlaan,
Knokke, Belgium
Filed Oct. 7, 1969, Ser. No. 864,352
Claims priority, application Belgium, Oct. 9, 1968,
64,519; Sept. 26, 1969, 79,567
Int. Cl. B01d 35/16
U.S. Cl. 210—159                                    9 Claims

ABSTRACT OF THE DISCLOSURE

A device for removing floating debris from water running in a channel, including a grate of inclined parallel bars, two pairs of gear wheels, and two parallel continuous chains running over the gear wheels and extending longitudinally of the bars. The device includes drive means for rotating the gear wheels, and a horizontal beam having teeth affixed thereto which are adapted to engage between the bars of the grate in a raking position to carry solid impurties retained against the grate.

---

This invention relates to a device for purifying liquids, particularly water, with a grate comprised of bars in parallel relationship, which is to be arranged cross-wise in a liquid stream and the upper part thereof extends out of the liquid up to a discharge duct or similar, whereby on the back side of the grate bars is mounted at least one support such as a supporting beam which extends approximately in parallel relationship with the grate along a direction at right angle to the lengthwise direction of the grate bars, said support being movable along said lengthwise direction and bringing the solid impurities retained by the grate in the liquid, to said discharge channel or similar, whereby the support is driven relative to the back side of the grate bars over substantially the whole height thereof with a rising and lowing motion and said support is provided with teeth which during the rising motion and the beginning of the lowering motion, extend between the grate bars while they are completely retracted behind the grate during the further lowering motion in an idle position, in such a way that the teeth during said rising motion raise the solid impurities retained by the grate from the liquid and discharge same in said discharge duct or similar.

A known device for purifying water is comprised of a slanting grate which is provided against the front side thereof with a scraper or ladle which performs an alternating vertical motion. This device has notably the disadvantage that the scraper or ladle has to pass in its downward motion thereof through the impurities which are retained by the grate, so that siad impurities are forced at least partially downwardly.

Another known device is comprised of a grate and of a frame moving up and down behind said grate, said support with teeth being mounted on said frame. This device has the disadvantage that by the rising motion, the frame has to be raised completely out of the water and consequently above the grate out of the water should be provided a structure which is nearly as high as the grate proper. Such a high structure should also be provided by the first-described known device. Furthermore the efficiency of said devices is rather low as on the one hand, but one scraper, ladle or support may be mounted on the grate and, on the other hand, said devices do not work continuously.

The invention has for object to provide such a device with a very high output, which is however very compact and may be mounted easily in a very short time.

For this purpose according to the invention, means are provided to drive the support along a closed continuous path on the back side of the grate bars, always in the same direction.

Usefully by a flat grate which at the end thereof extending above the liquid is bent backwards to the discharge duct or similar, the closed continuous path is comprised of two straight portions in parallel relationship with the flat grate, the corresponding ends thereof being connected to one another by semicircular portions, whereby said straight portions determine the rising and lowering motions of the support while the semicircular portions determine the change from the rising to the lowering motion and vice versa.

In an advantageous embodiment of the invention, the support is comprised of a shaft to which the teeth are attached and each end of which is guided in a first closed guideway which extends along said path, whereby to each shaft end is made fast a lever which is guided in a second guideway, the spacing from said second guideway to the first one is substantially constant at least over that portion of the path which determines the rising motion of the shaft, whereby said shaft undergoes consequently but a translation during said motion, and said spacing so varies over those portions of said path which determine the changes between the rising and lowering motions, that the shaft undergoes both a translation and a rotation over the change portions and the teeth are swung backwards to a position in substantially parallel relationship with the shaft driving mechanism, while said teeth are swung frontwards by the change between the lowering and rising motions to a position substantially at right angle to the grate.

Other details and features of the invention will stand out from the description given below by way of non limitative example and with reference to the accompanying drawings in which:

FIG. 1 is a front view of a device according to the invention.

FIG. 2 is a section along line II—II of FIG. 1, on a larger scale.

FIG. 3 is a section along line III—III of FIG. 4, on a smaller scale.

FIG. 4 show a partial section along line IV—IV of FIG. 2, on a larger scale.

FIG. 5 is a kinematic showing of the top part of the device according to the invention.

FIG. 6 is a kinematic showing of the bottom part of the device according to the invention.

In the various figures, the same reference numerals pertain to similar elements.

In the drawings has been shown a device for the raising and discharging of solid impurities from water running in a channel.

This device is comprised mainly of a grate 2 formed by bars 1 in parallel relationship with one another, which is arranged cross-wise in a channel 3 through which flows water along the direction 8, by a discharge duct 4 and by two driven shafts 5 and 6 on which are mounted teeth 7.

The grate 2 is attached with the lower end thereof on the bottom 9 of the channel 3 and it is bent at the top backwards over an angle of 180°, in such a way that said grate ends inside the discharge duct 4 which is mounted above the channel 3. The grate 2 slants backwards and stands at an angle of about 10° to the vertical.

The shafts 5 and 6 extend on the back side of the grate 2, in parallel relationship therewith along a direction at right angle to the lengthwise direction of the bars 1. Each end of said shafts 5 and 6 is guided by means of a running wheel 23 which is mounted idle on said ends, inside a first closed guideway 10 which is comprised of two straight portions 11 and 12 in parallel relationship with the bars 1 and the corresponding ends of which are connected to one another by semicircular portions 13 and 14. On each one of said ends of the shafts 5 and 6 is mounted a lever 15 the axis of which stands at right angle to the axis of shafts 5 and 6. To the free end of said lever 15 is rotably attached a running wheel 16 which is movable inside a second closed guideway 17 which is comprised of two straight portions 18 and 19 and of two bent portions 29 and 30 which connect together the corresponding ends of the straight portions 18 and 19.

The corresponding ends of the shafts 5 and 6 are connected together by an endless chain 20 which drives and moves the shafts inside the guideways 10 which are mounted on either side of the grate 2 inside boxes 21 which are integral with said grate. The chains 20 are each comprised of two equal portions which connect together the corresponding ends of the shafts 5 and 6 and which are supported at regular intervals by running wheels 22 which move also inside the guideways 10. Each chain 20 runs over two gear wheels 24 and 25 which are located on the back side of the grate 2 adjacent the ends thereof. The bottom wheels 25 are idle while the top wheels 24 which are mounted on one and the same shaft 32, are driven by a motor (not shown) which is arranged below the bent back end of the grate 2.

Each box 21 is comprised of two parts 26 and 27 which are movable relative to one another along the lengthwise direction of the bars 1 and which are telescoped inside one another. In the part 26 is mounted the gear wheel 24 while in the part 27 is arranged the gear wheel 25, in such a way that by moving both parts relative to one another, the spacing between the gear wheels 24 and 25 may be adjusted and the chain may be tightened. The corresponding parts of the boxes 21 which lie on either side of the grate 2, are connected by cross ties 28.

The straight portions 18 and 19 of the guideway 17 are parallel to the straight portions 11 and 12 of the guideway 10.

The spacing between the portions 11 and 18 and the spacing between the portions 12 and 19 is determined by the length of the lever 15, in such a way that whenever the ends of a shaft 5 or 6 is guided inside the portion 18, the teeth 7 attached to said shaft project between the grate bars 1 in a position substantially at right angle to said bars 1, and when the considered shaft is guided inside the portion 12 of the guideway 10, the teeth 7 are substantially parallel to said portion 12.

The running of the portions 18 and 19 of the guideway 17 relative to the corresponding semicircular portions 13 and 14 of the guideway 10 is so designed that the shafts 5 and 6 undergo during the translation thereof over the portions 13 and 14, simultaneously a rotating about their axis and the teeth 7 by the moving of the shafts 5 and 6 over the portion 13, are swung backwards over an angle of substantially 90° to the above-described position in which they are in parallel relationship with the moving direction of the chain 20. Said teeth 7 are swung frontwards by the moving of the shafts over the portion 14, on the inner side thereof over an angle of substantially 90°, to the above-described position in which the teeth are at right angle to the grate bars 1.

To obtain the above-described rotations of the shafts, the running of said bent portions 29 and 30 is determined kinematically by bringing, as shown in FIGS. 5 and 6, the teeth 7 in the various succeeding desired positions thereof during the displacement of the shafts 5 and 6 over the semicircular portions of the guideways 10 and by marking in each position with a dot 31, the resulting position of the axis of the running wheel 16 which rotates freely on the lever 15. The resulting dots 31 allow to construct the curved portions 29 and 30 of the guideway 17. The various intermediate positions of the teeth 7, during said rotation thereof about the axis of the shafts 5 and 6 are shown in FIGS. 5 and 6 only by the lengthwise centre-lines of the teeth 7 and of the lever 15 as on the one hand, these centre-lines are enough to construct the path of the portions 29 and 30 of the guideway 17 and, on the other hand, the figures 5 and 6 do not lose in clearness thereby.

The operation of the above-described device is as follows:

Both chains 20 and consequently the shafts 5 and 6 which are mounted thereon are driven continuously along the direction of arrow 39. The teeth 7 are swung frontwards at the bottom of the grate 2 so as to project therethrough and they carry along by the rising movement of said teeth, the solid impurities which are retained by the grate 2. Said solids are raised from the water and moved over the bent end of the grate 2 to be discharged in the discharge duct.

The teeth 7 during the movement thereof between the upper ends of the grate bars 1, which are bent over an angle of 180°, are swung backwards in the above-described way, so that the angle formed between the front side of said teeth 7 and that surface tangent to the cylinder surface determined by the lengthwise axes of the bent bars, in the intersection of said surface with that plane which is determined by the lengthwise axes of the bent bars, never becomes smaller than 90° with the result that the retained solids are never stuck between the teeth and the grate 2. After the discharge of the solids by the teeth in the discharge duct, said teeth slide completely out of the bars 1, to reach a swung-back position along the movement direction of the shaft they are mounted on, and said teeth move in this idle position to the bottom of the grate 2 where they swing to the front to a position at right angle to the grate. In this way, a new cycle begins.

The device according to the invention has the advantage that the complete driving and moving mechanism is built behind the grate without even one moving member coming out of the grate or above same.

Even though the number of shafts has been limited to two in the above-described device, the usefulness thereof may be increased by arranging at regular intervals a plurality of shafts provided with teeth.

The moving members of the device such as the chains and the shafts are all easy to reach above the water level for the maintenance and possible replacement thereof.

The invention is in no way limited to the above embodiment and many changes may be brought therein without departing from the scope of the invention as defined by the appended claims.

For instance, during the change of direction of the support by the bottom transition, the curved portion 30 of the guideway 17 may be dispensed with, in such a way that the running wheel 16 of the lever 15 gets free when leaving the straight portion 19 of the guideway 17. This results in the support rotating freely in said transition and the teeth being directed downwards. In this way the running wheel 16 which runs forward during the falling movement of the support, relative to the running wheel 23, is brought back relative to said running wheel 23 during the rising movement of the support, whereby the teeth as required, come to lie at right angle to the grate.

On the other hand to the shaft of the upper gear wheels 24 may be coupled a lubricating pump which enables to lubricate continuously the chains 20.

A spraying device which has for example a downwardly-narrowing vertical tube provided with ports, may be arranged for the washing away of the slime which might deposit at the bottom behind the grate.

Further, mainly in shallow channels, against the bottom may be provided a substantially horizontal grate above a recess provided in said bottom in front of the grate, so as to allow without any danger of binding for the teeth, said teeth to come through said horizontal grate as close as possible to the bottom and to obtain in

I claim:

1. A device for removing floating debris from water running in a channel, comprising:
    a grate of inclined bars in parallel relationship, which is arranged across the water stream running in said channel, the top ends of said bars having a substantially straight portion and being arcuately bent to form a downwardly concave bight of the grate;
    two pairs of gear wheels, each pair being rotatably mounted on the same horizontal shaft, one pair of said gear wheels being arranged in said bight portion and spaced from the other pair of said gear wheels longitudinally of said bars;
    two parallel continuous chains trained over said gear wheels and each having two strands extending longitudinally of said bars;
    drive means for rotating said gear wheels;
    at least one horizontal beam being mounted for rotation around its axis between said chains and being provided with a group of teeth fixed and spacedly aligned on said beam perpendicularly to said beam;
    said teeth being disposed to engage between said bars of said grate in a raking position carrying away the solid impurities retained against said grate;
    and at least one lever fixed on said beam and having its axis extending transversely with respect to the axis of said beam, said lever being guided for a certain distance from its fastening point on the beam in a guideway corresponding to the way followed by the adjacent chain, the spacing between said adjacent chain and said guideway varying in the vicinity of the gear wheels so that the beam undergoes first in the vicinity of the place where the chains are leaving said one pair of gear wheels both a translation and a rotation around its axis to swing the teeth backwardly to a position in substantially parallel relationship with the direction of motion of the chains, and then in the vicinity of said other pair of gear wheels a rotation around its axis to swing the teeth to the raking position.

2. Device as claimed in claim 1, in which each chain and the gear wheels the chain runs over are arranged inside a box which is comprised of two parts which are movable relative to one another along the lengthwise direction of the grate bars, whereby one gear wheel is mounted inside each one of said parts with the result that the spacing between said gear wheels is adjustable and the chain located inside said box may be tightened.

3. Device as claimed in claim 1, in which the axis of the lever stands substantially at right angles to the beam axis.

4. Device as claimed in claim 1, in which the upper gear wheels are driven by a motor which is mounted on a bracket arranged behind the top end of the grate.

5. Device as set forth in claim 1, wherein a lever, guided in a guideway, is provided on each end of said beam.

6. Device as set forth in claim 1, wherein the guided portion of said lever is provided with a guide-roller moving on said guideway.

7. Device as set forth in claim 1, wherein the strands of at least one chain extending longitudinally of the bars of the grate are guided.

8. Device as set forth in claim 7, wherein the said one chain is guided by means of rollers moving on a guideway, and at least one roller is mounted on said chain for rotation about the axis of said beam.

9. Device as set forth in claim 8, wherein the lever is mounted on the free end of the beam passing through said adjacent chain, and said roller is provided at the other side of said chain.

References Cited

UNITED STATES PATENTS

| | | | |
|---|---|---|---|
| 452,595 | 5/1891 | Correll | 210—162 |
| 332,790 | 12/1885 | Crisman | 210—159 |
| 2,307,601 | 1/1943 | Nichols | 210—159 |
| 2,684,157 | 7/1954 | Tolman | 210—159 |
| 2,978,105 | 4/1961 | Poheim | 210—159 |
| 3,190,448 | 6/1965 | Johnston et al. | 210—162 |
| 3,144,406 | 4/1964 | Crise | 210—159 |
| 3,464,558 | 9/1969 | Harvanek et al. | 210—159 |

REUBEN FRIEDMAN, Primary Examiner

T. A. GRANGER, Assistant Examiner